June 5, 1962  H. BROSCHKE  3,037,436
CAMERA WITH A BUILT-IN EXPOSURE METER
Filed April 11, 1961  4 Sheets-Sheet 1

INVENTOR
HEINRICH BROSCHKE
BY Toulmin & Toulmin
Attorneys

June 5, 1962 H. BROSCHKE 3,037,436
CAMERA WITH A BUILT-IN EXPOSURE METER
Filed April 11, 1961 4 Sheets-Sheet 2

INVENTOR
HEINRICH BROSCHKE
BY Toulmin & Toulmin
Attorneys

June 5, 1962  H. BROSCHKE  3,037,436
CAMERA WITH A BUILT-IN EXPOSURE METER
Filed April 11, 1961  4 Sheets-Sheet 3

INVENTOR
HEINRICH BROSCHKE
BY Toulmin & Toulmin
Attorneys

June 5, 1962   H. BROSCHKE   3,037,436
CAMERA WITH A BUILT-IN EXPOSURE METER
Filed April 11, 1961   4 Sheets-Sheet 4

INVENTOR
HEINRICH BROSCHKE
BY Toulmin & Toulmin
Attorneys 3,037,436
CAMERA WITH A BUILT-IN
EXPOSURE METER
Heinrich Broschke, Wetzlar (Lahn), Germany, assignor to
Ernst Leitz Gesellschaft mit beschrankter Haftung,
Wetzlar (Lahn), Germany
Filed Apr. 11, 1961, Ser. No. 102,257
Claims priority, application Germany Apr. 21, 1960
8 Claims. (Cl. 95—10)

The present invention relates to a camera having a built-in exposure meter, more particularly, to a clutch arrangement between a pivotally mounted measuring instrument of the exposure meter and the mechanism for adjusting the exposure time and diaphragm opening of the camera.

Cameras with built-in exposure meters are generally known. These cameras may comprise a pivotally mounted measuring instrument which is a component of the exposure meter and which is coupled by a differential gear to the mechanism for adjusting the exposure value of the camera. The exposure value is accurately set for the existing light conditions when the adjusting mechanism for both the exposure time and diaphragm opening has been so adjusted that the pointer of the measuring instrument registers with a stationary index.

In general, the range of the exposure values controlled by such cameras does not conform with the range of the exposure meter. On the average, cameras have an exposure time range comprising 12 time intervals which, for a film of a given sensitivity, correspond to an even number of exposure values. By using films of different sensitivities this range of exposure times may be increased by both higher or lower values. Thus, the camera is capable of being adjusted to more than 12 exposure values.

In addition, the diaphragm opening also contributes to the increase in the range of the exposure values of a camera, although to a much smaller extent.

The measuring range of a moving-coil measuring instrument usually comprises about 13 exposure values and this range is limited by the range of the pivoting movement of the measuring instrument pointer. Therefore, various combinations of the exposure time and diaphragm opening are possible and these combinations may correspond to exposure values beyond the range of the exposure meter.

In order to set all of the combinations of exposure time and the diaphragm opening by means of an adjusting mechanism connected to the measuring instrument, the measuring instrument should be rotatable through an angle which is greater than the angle of deflection of the pointer of the measuring instrument. However, it is not always possible to so mount the measuring instrument in modern cameras. In some cameras the range of the pointer is limited by stationary stops so that any rotation of the measuring instrument beyond this range would cause a deformation of the pointer. Another reason is that the angle of deflection of the pointer of the measuring instrument is relatively small per exposure value and accordingly the pointer must have a considerable length in order to indicate this deflection to the user of the camera. When a long pointer is used, however, much space is required for pivoting the measuring instrument beyond the range of the total deflection of the pointer. This space is not available in a modern camera.

One solution has been to position a releasable clutch between the measuring instrument and the adjusting mechanism of the camera. This clutch functions to disconnect the measuring instrument and the adjusting mechanism whenever the measuring range of the exposure meter and the adjustment of the camera no longer coincide. The adjusting range of the camera may either be less or greater than the measuring range of the exposure meter. It is therefore necessary to disengage this clutch at that precise moment wherein the exposure value established by the adjusting mechanism of the diaphragm opening and exposure time exceeds the measuring range of the camera. When the adjusting mechanism is subsequently used for establishing new exposure values which are within the measuring range of the exposure meter the clutch must engage the measuring instrument of the adjusting mechanism at precisely the same relative position that these components had with respect to each other prior to the disengagement of the clutch.

Such releasable clutches had the disadvantage that the clutch was manually operated by the camera user. This meant that the user of the camera had to give his attention to the operation of the clutch to ensure that the disengagement and engagement of the clutch occurred at precisely the right moment.

Some cameras are provided with a belt connection between the adjusting mechanism and the measuring instrument. This belt can be displaced to compensate for the sensitivity of the film. It has been possible to use this relative displacement as a form of a clutch in that the adjusting mechanism is disconnected from the measuring instrument. When the adjusting mechanism is set to exposure values beyond the measuring range of the exposure meter the pivoting movement of the measuring instrument is limited by a stop and an adjustment made to compensate for the sensitivity of the film. When the combination of the exposure time and the diaphragm opening is subsequently set to an exposure value within the range of the measuring instrument the sensitivity of the film must be reset. Thus, this construction also has the disadvantage that the user of the camera must also give attention to this adjustment for film sensitivity.

It is therefore the principal object of this invention to provide a novel and improved camera having a built-in exposure meter.

It is another object of this invention to provide a clutch arrangement between the pivotally mounted measuring instrument and the means for adjusting the exposure time and diaphragm opening of a camera.

The above objects are accomplished and the disadvantages of the prior art are eliminated by providing a clutch arrangement wherein the coupling and uncoupling of the adjusting mechanism with respect to the measuring instrument is accomplished automatically whenever the exposure time established by the adjusting mechanism falls outside of the range of the exposure meter.

The present invention essentially comprises a pivotally mounted measuring instrument which is connected by a differential gear arrangement with the exposure time and diaphragm opening adjusting mechanism. There are two peg-like cam members one of which is mounted on the measuring instrument and the other is connected to a gear actuated by the driven member of the differential gear arrangement. These cam members are positioned between two levers which are pivotally mounted coaxial with respect to the measuring instrument. Spring means are provided to urge the two levers to a closed position against the cam members.

Whenever the two cam members diverge because of the continued adjustment of the adjusting mechanism but the measuring instrument has reached the extreme of its pivoting range, one of the levers will move against the action of the spring so that the adjusting mechanism can be continued to be operated even though the pivoting movement of the measuring instrument has been arrested. When the adjusting mechanism is returned to a so-called normal position, the measuring instrument will be pivoted whenever the two levers are in their closed position against the cam members. As a result, the measuring instrument is automatically coupled to the camera adjusting mechanism in the same fixed relative position between the measuring instrument and the camera adjusting mechanism.

Other objects and advantages of this invention will become apparent upon reference to the accompanying description when taken in conjunction with the following drawings, wherein FIGURE 1 is a portion of a front elevational view of a camera having a built-in exposure meter and the clutch arrangement of the present invention with portions of the camera wall being cut away to illustrate the mechanism;

FIGURE 3 is a side elevational view of the measuring instrument and the clutch arrangement as illustrated in FIGURE 1 but shown in enlarged scale and with the clutch arrangement being illustrated in section, taken along the line III—III of FIGURE 3a.

A specific embodiment and a modification of this invention will be described with reference to the drawings wherein like reference symbols indicate the same parts throughout the various views.

Figure 1:
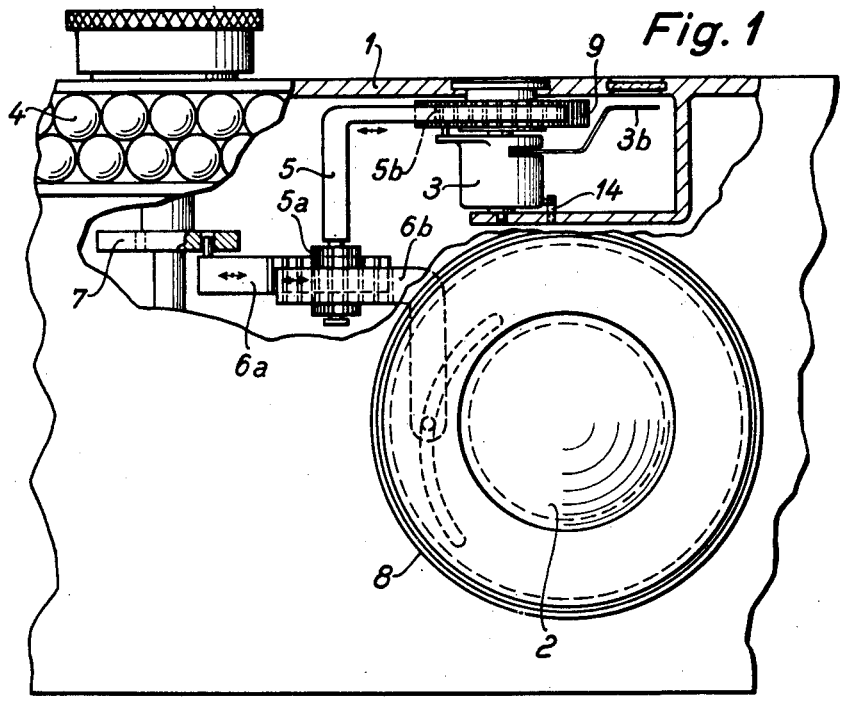

Returning to FIGURES 1 and 2 there is shown therein a camera casing 1 having an objective 2. The camera is provided with a built-in exposure meter which includes a rotatably mounted measuring instrument 3 which has a linear response and a photoelectric cell 4 which is connected to the measuring instrument.

There is a compensating member 5 of a differential gear arrangement which also comprises a rack 6a which is connected through a cam follower and cam groove arrangement with the exposure time adjusting mechanism 7. There is another rack 6b which is similarly operatively connected by means of a cam follower and a cam groove with the diaphragm opening adjusting mechanism 8. A pinion 5a is mounted on the compensating member 5 and meshes with both the racks 6a and 6b. The other end of the member 5 is provided with a toothed rack 5b which meshes with a gear 9 which is coaxially mounted with the measuring instrument 3. The gear 9, however, is mounted independently of the measuring instrument 3. The gear 9 has an axially extending peg 9a mounted thereon.

Figure 3:
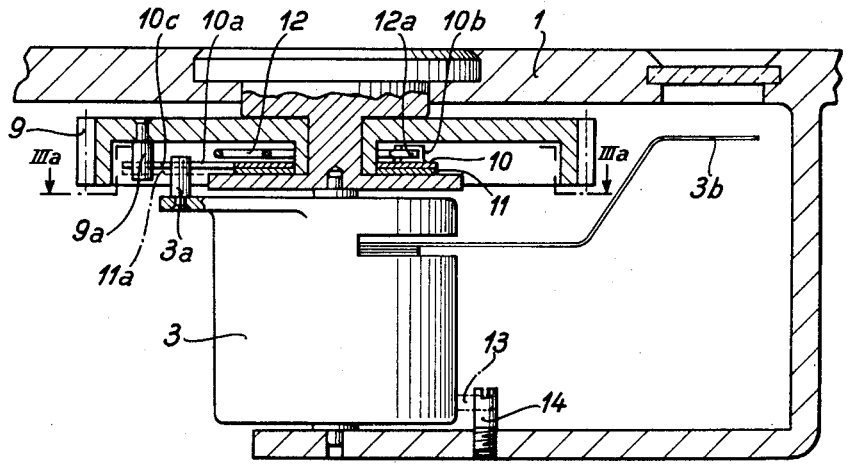
Figure 3A:
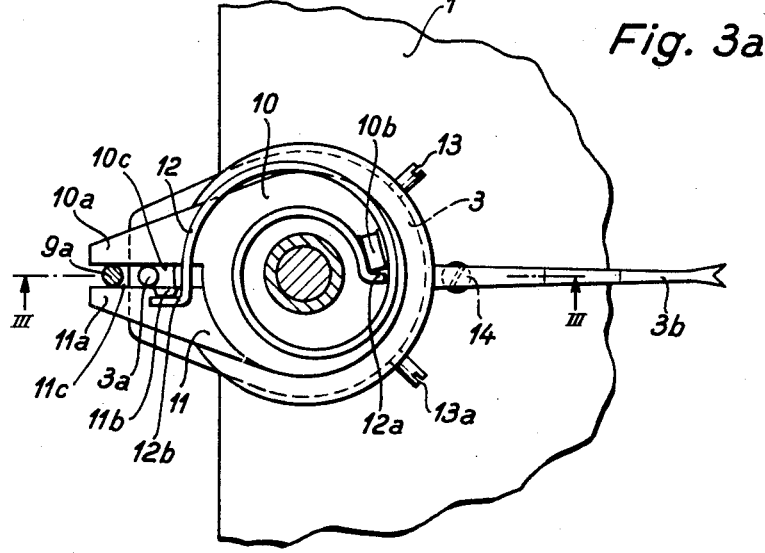
FIGURE 3a is a sectional view, taken along the line IIIa—IIIa of FIGURE 3.

A pair of levers 10 and 11 is pivotally and coaxially mounted between the gear 9 and the measuring instrument 3. The levers 10 and 11 are superposed with respect to each other and are urged to the position as indicated in FIGURE 3a by a spiral spring 12, one end 12a of which engages a projection 10b on the lever 10 and the other end 12b engages a projection 11b on the lever 11. Under the action of the spring 12 the levers 10 and 11 rotate towards each other so as to provide a clamping action. The levers 10 and 11 have substantially radially extending surfaces 10c and 11c between which are engaged the gear peg 9a and a peg 3a which is mounted on the measuring instrument 3. As can be seen in FIGURE 3 the levers 10 and 11 are contiguous to each other. The measuring instrument 3 has a pair of radially extending arms 13 and 13a which are engageable with a stop 14 mounted in the camera casing. The action of the arms 13 and 13a with respect to the stop 14 limits the range of pivoting movement of the measuring instrument.

The releasable clutch arrangement of this invention is formed by the levers 10 and 11, the spring 12 and the cam members or pegs 3a or 9a. The arrangement is in a coupled or engaged position whenever the pegs 3a and 9a abut or engage the two lever surfaces 10c and 11c.

Figure 2:
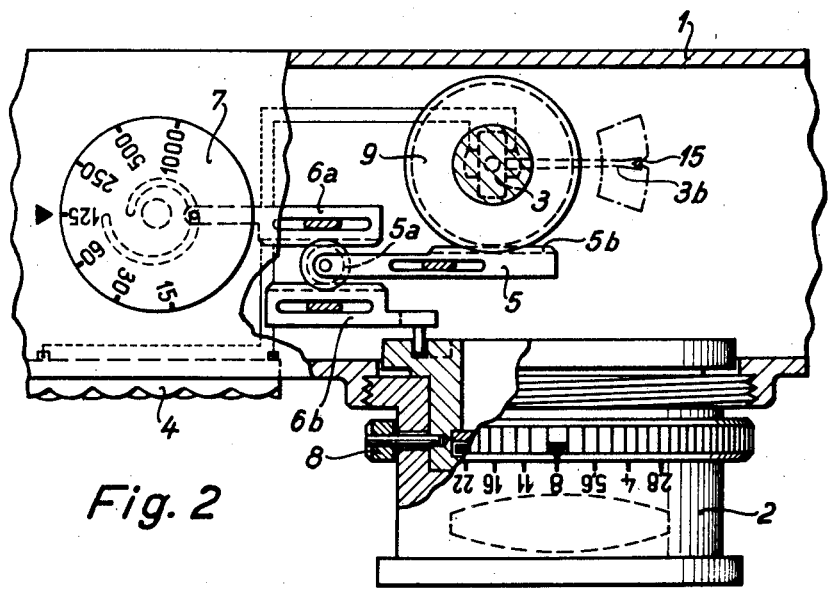
FIGURE 2 is a top plan view of the mechanism as illustrated in FIGURE 1.

The operation of this clutch arrangement is as follows: Adjustment of the exposure time member 7 and the diaphragm opening member 8 will cause the measuring instrument to be freely pivoted through the action of the differential gear arrangement 6a, 6b and 5. The movement of the compensating member 5 will bring about a movement of the gear 9. The movement of the gear 9 will be transmitted through the peg 9a, the levers 10 and 11 and the peg 3a to the measuring instrument 3. This pivoting movement of the measuring instrument will occur only within the range as defined by the limit arms 13 and 13a. Therefore, for combinations of the exposure time and the diaphragm opening occurring within the range of the measuring instrument the pointer 3b of the measuring instrument can be readily returned to a stationary index 15, as shown in FIGURE 2.

When the combination of the exposure time and diaphragm opening as established by the adjusting members 7 and 8 corresponds to an exposure value beyond the range of the exposure meter, the gear 9 will continue to rotate but the rotating movement of the measuring instrument 3 will be stopped by one of the arms 13 or 13a engaging the stop member 14. The continued rotation of the gear 9 resulting from the continued operation of the adjusting members 7 and 8 will cause the peg 9a to force the levers 10 and 11 apart against the force exerted by the spring 12. Thus it is apparent that when the camera is adjusted in this manner the connection between the adjusting members 7 and 8 and the measuring instrument 3 is disconnected.

When a subsequent combination of the exposure time and diaphragm opening is selected which corresponds to an exposure value within the range of the exposure meter, the gear 9 will rotate in a reversed direction. Levers 10a and 11a will then approach each other until they both abut the pegs 3a and 9a, as illustrated in FIGURE 3a. At this moment the rotary movement of the gear 9 is again transmitted to the measuring instrument 3 and the clutch is now in its engaged position.

It can be seen that the engagement and disengagement between the measuring instrument 3 and the adjusting members 7 and 8 is automatically accomplished at the same fixed position with respect to each other. It is therefore readily possible to disengage this clutch arrangement whenever the adjustment of the camera members exceeds the range of the exposure meter on either side thereof.

Figure 4:
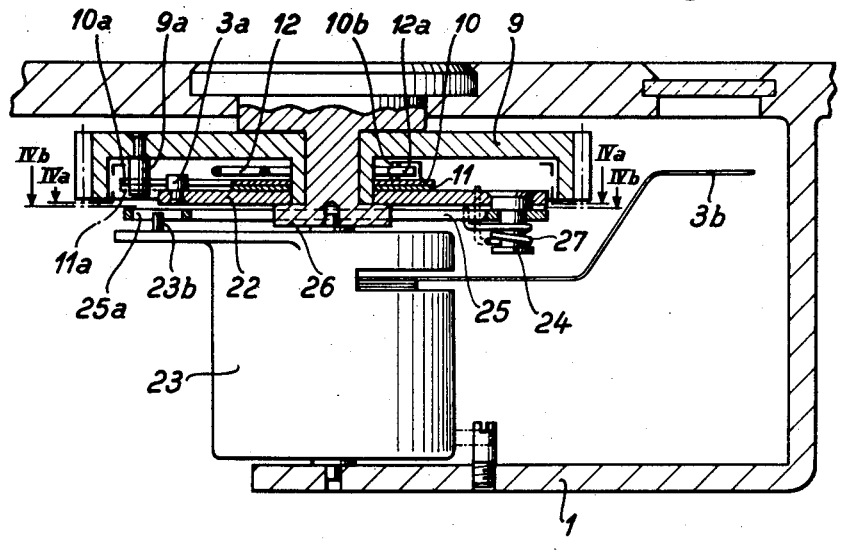
FIGURE 4 is a view similar to that of FIGURE 3 but showing a modification of the invention which includes structure for adapting a measuring instrument having a non-linear response to the movement of the adjusting mechanism.
Figure 4A:
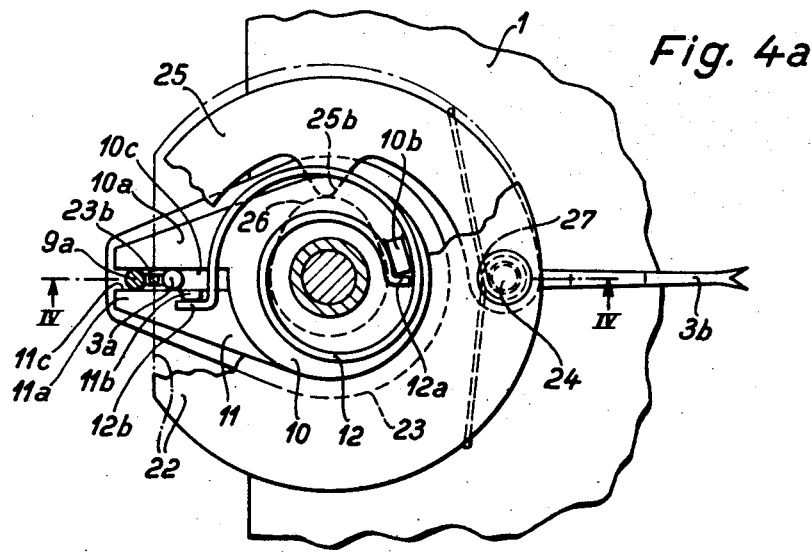
FIGURE 4a is a sectional view, taken along the line IVa—IVa of FIGURE 4.
Figure 4B:
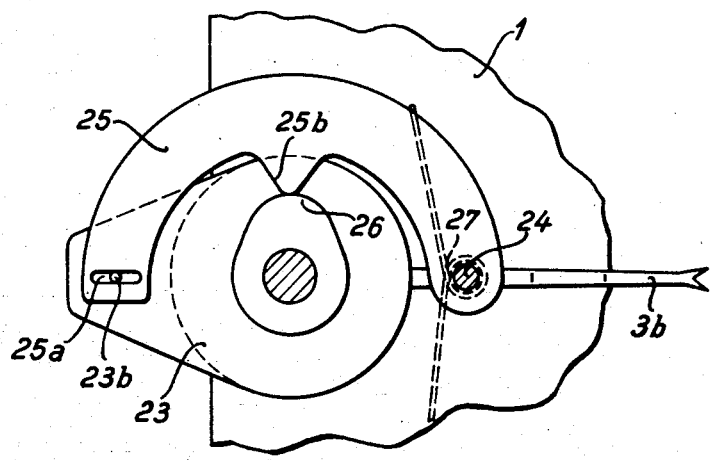
FIGURE 4b is a sectional view, taken along the line IVb—IVb of FIGURE 4.

Proceeding to FIGURES 4, 4a and 4b, there is illustrated a modification of this invention wherein a measuring instrument with a non-linear response is employed. It will be recalled that the measuring instrument in the previously described embodiment had a linear response. The present modification accordingly requires additional gearing to adapt the non-linear response of the measuring instrument to the linear subdivision of the adjustment ranges of the exposure time and the diaphragm opening.

The clutch arrangement of the modification is essentially the same as that described in the foregoing embodiment. However, in this modification the measuring instrument peg 3a is not directly connected with the non-linear instrument 23 but is mounted upon a disk 22 which is pivotally and coaxially mounted with respect to the measuring instrument 23 and the gear 9.

The disk 22 has an axially extending peg 24 upon which is pivoted a curved lever 25. The lever 25 has a slot 25a in its free end as illustrated in FIGURE 4b. The slot 25a receives a peg 23b which is fixedly mounted on the measuring instrument 23. The lever 25 also has a cam portion 25b which engages a radial cam 26 which is fixedly mounted on the camera casing 1. A spring 27 biases the lever 25 in such a manner that the cam 25b is in continuous engagement with the cam surface 26.

In the operation of this invention the movement of the adjusting members 7 and 8 is not directly transmitted from the clutch arrangement 3a, 9a, 10, 11 and 12 to the measuring instrument 23, but first to the rotatably mounted disk 22. The pivoting movement of the disk 22 essentially corresponds to the pivoting of the gear 9 in that range of pivoting which corresponds to the range of the exposure meter. The pivoting movement of the measuring instrument 23, however, does not coincide with the rotary movement of the disk 22 and the gear 9. The pivoting movement of the measuring instrument 23 depends upon the pitch of the cam surface 26. The lever 25 transmits the pivoting movement of the disk 22 to the measuring instrument by the movement of the lever resulting from the engagement of the cam 25b sliding over the cam surface 26. This movement corrects the movement of the measuring instrument so that the measuring instrument 23, which has a non-linear response, may be connected with the adjusting members of the camera which have linear scales.

Thus it can be seen that the present invention provides a releasable clutch arrangement for a camera having a built-in exposure meter wherein the clutch arrangement can be used with a measuring instrument having either a linear response or a non-linear response. Further, the clutch arrangement is simple in construction and dependable in operation since the action of the clutch depends substantially upon a spring biassing two lever arms into engagement with members connected to the measuring instrument and to a gear actuated by the adjusting mechanism.

It will be understood that this invention is susceptible to modification in order to adapt it to different usages and conditions and, accordingly, it is desired to comprehend such modifications within this invention as may fall within the scope of the appended claims.

What I claim is:

1. In a camera having a built-in exposure meter including a pivotally mounted measuring instrument having a limited range of pivoting movement, means for adjusting the exposure time and diaphragm opening of the camera, a gear coaxial with said measuring instrument and operatively connected to said adjusting means to be actuated thereby, first and second levers mounted coaxially with said measuring instrument, each lever having a radially extending edge with said radial edges being opposed to each other, a spring acting on said levers to bias said radial edges towards each other, and an axially extending peg on said measuring instrument and an axially extending peg on said gear with said pegs being positioned between said radial edges and engageable therewith.

2. In a camera having a built-in exposure meter including a pivotally mounted measuring instrument, means for limiting the range of pivoting movement of said measuring instrument, means for adjusting the exposure time and diaphragm opening of the camera, a gear coaxial with said measuring instrument and operatively connected to said adjusting means to be actuated thereby, first and second levers mounted coaxially with said measuring instrument, each lever having a radially extending edge with said radial edges being opposed to each other, a spring acting on said levers to bias said radial edges towards each other, and an axially extending peg on said measuring instrument and an axially extending peg on said gear with said pegs being positioned between said radial edges and engageable therewith.

3. In a camera having a built-in exposure meter including a pivotally mounted measuring instrument having a limited range of pivoting movement, means for adjusting the exposure time and diaphragm opening of the camera, a gear coaxial with said measuring instrument, a differential gear arrangement operatively connecting said adjusting means and said gear, first and second levers mounted coaxially with said measuring instrument, each lever having a radially extending edge with said radial edges being opposed to each other, a spring acting on said levers to bias said radial edges towards each other, an axially extending peg on said measuring instrument and an axially extending peg on said gear with said pegs being positioned between said radial edges and engageable therewith.

4. In a camera having a built-in exposure meter including a pivotally mounted measuring instrument having a limited range of pivoting movement, means for adjusting the exposure time and diaphragm opening of the camera, a gear coaxial with said measuring instrument and operatively connected to said adjusting means to be actuated thereby, first and second levers mounted coaxially with said measuring instrument, each lever having a radially extending edge with said radial edges being opposed to each other, said levers being in superposed relationship to each other, a spring acting on said levers to bias said radial edges towards each other, an axially extending peg on said measuring instrument and an axially extending peg on said gear with said pegs being positioned between said radial edges and engageable therewith.

5. In a camera having a built-in exposure meter including a pivotally mounted measuring instrument having a limited range of pivoting movement, means for adjusting the exposure time and diaphragm opening of the camera, a gear coaxial with said measuring instrument and operatively connected to said adjusting means to be actuated thereby, first and second levers mounted coaxially with said measuring instrument, each lever having a radially extending edge with said radial edges being opposed to each other, a spring acting on said levers, said spring being spiral with one end thereof engaging one lever and the other end thereof engaging the second lever, an axially extending peg on said measuring instrument and an axially extending peg on said gear with said pegs being positioned between said radial edges and engageable therewith.

6. In a camera having a built-in exposure meter including a measuring instrument having a non-linear response, said measuring instrument being pivotally mounted for a limited range of pivoting movement, means for adjusting the exposure time and diaphragm opening of the camera, a gear coaxial with said measuring instrument and operatively connected to said adjusting means to be actuated thereby, a plate coaxial with said measuring instrument, first and second levers mounted coaxially with said measuring instrument and positioned between said gear and said plate, each lever having a radially extending edge with said edges being opposed to each other, a spring acting on said levers to bias said radial edges towards each other, axially extending pegs on said measuring instrument and said gear with said gear peg being engageable with said radial edges, and means including the other peg interconnecting said measuring instrument and said plate for adapting the non-linear response of said measuring instrument to a linear scale.

7. In an instrument, a pivotally mounted measuring mechanism, means for limiting the pivoting movement of said measuring mechanism, means for adjusting a factor in said instrument affecting the reading thereof, a gear coaxial with said measuring mechanism and operatively connected to said adjusting means to be actuated thereby, first and second levers mounted coaxially with said measuring mechanism, each lever having a radially extending edge with said radial edges being opposed to each other, a spring acting on said levers to bias said radial edges towards each other, an axially extending peg on said measuring mechanism and an axially extending peg on said gear with said pegs being positioned between said radial edges and engageable therewith.

8. In a camera having a built-in exposure meter including a pivotally mounted measuring instrument having a moveable indicating pointer, means for limiting the range of pivoting movement of said measuring instrument, there being a stationary index on the camera for registration with said pointer, means for adjusting a factor in said camera affecting the operation thereof, a gear coaxial with said measuring instrument and operatively connected to said adjusting means to be actuated thereby, first and second levers mounted coaxially with said measuring instrument, each lever having a radially extending edge with said radial edges being opposed to each other, a spring acting on said levers to bias said radial edges towards each other, an axially extending peg on said measuring instrument and an axially extending peg on said gear with said pegs being positioned between said radial edges and engageable therewith.

References Cited in the file of this patent

UNITED STATES PATENTS

| | | |
|---|---|---|
| 2,194,152 | Riszdorfer | Mar. 19, 1940 |
| 2,250,898 | Tonnies | July 29, 1941 |
| 2,933,991 | Sauer | Apr. 26, 1960 |